United States Patent
Wang

(10) Patent No.: US 10,255,874 B2
(45) Date of Patent: Apr. 9, 2019

(54) DISPLAY CONTROLLING METHOD AND DISPLAY DEVICE

(71) Applicants: HKC Corporation Limited, Shenzhen, Guangdong (CN); Chongqing HKC Optoelectronics Technology Co., Ltd., Chongqing (CN)

(72) Inventor: Mingliang Wang, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 15/557,808

(22) PCT Filed: May 26, 2017

(86) PCT No.: PCT/CN2017/086116
§ 371 (c)(1),
(2) Date: Sep. 12, 2017

(87) PCT Pub. No.: WO2018/113187
PCT Pub. Date: Jun. 28, 2018

(65) Prior Publication Data
US 2018/0293954 A1    Oct. 11, 2018

(30) Foreign Application Priority Data
Dec. 19, 2016   (CN) .......................... 201611178597.4

(51) Int. Cl.
*G09G 5/00* (2006.01)
*G06K 9/00* (2006.01)
(Continued)

(52) U.S. Cl.
CPC ............. *G09G 5/003* (2013.01); *G06F 3/011* (2013.01); *G06F 3/147* (2013.01); *G06K 9/0061* (2013.01);
(Continued)

(58) Field of Classification Search
CPC .. G09G 5/00; G09G 2320/00; G09G 2320/08; G09G 2354/00; G06F 3/011;
(Continued)

(56) References Cited

U.S. PATENT DOCUMENTS

2009/0228841 A1* 9/2009 Hildreth ................ G06F 3/0304
                                                                    715/863
2009/0231145 A1* 9/2009 Wada .................. A61B 5/02416
                                                                    340/575

(Continued)

FOREIGN PATENT DOCUMENTS

| CN | 102915193 A | 2/2013 |
| CN | 105809139 A | 7/2016 |
| CN | 106156806 A | 11/2016 |

*Primary Examiner* — Joe H Cheng

(57) ABSTRACT

Disclosed are a display controlling method, a terminal, and a display device. The method includes the steps of capturing an image in a photographic area in front of a terminal in real time, calculating a user's eye blink frequency according to captured image, selecting a corresponding operation according to the eye blink frequency and a predetermined rule which relates to a corresponding relationship between the eye blink frequency and an operation, and controlling the terminal and the display device to execute a corresponding function according to the operation.

14 Claims, 6 Drawing Sheets

(51) Int. Cl.
*G06F 3/01* (2006.01)
*G06F 3/147* (2006.01)

(52) U.S. Cl.
CPC ..... *G06K 9/00261* (2013.01); *G06K 9/00281* (2013.01); *G06K 9/00315* (2013.01); *G06K 9/00604* (2013.01); *G06K 9/00617* (2013.01); *G09G 2320/08* (2013.01); *G09G 2330/021* (2013.01); *G09G 2330/022* (2013.01); *G09G 2354/00* (2013.01); *G09G 2360/14* (2013.01)

(58) Field of Classification Search
CPC ........... G06K 9/00261; G06K 9/00281; G06K 9/00597; G06K 9/00604
See application file for complete search history.

(56) References Cited

U.S. PATENT DOCUMENTS

| | | | |
|---|---|---|---|
| 2010/0073497 A1* | 3/2010 | Katsumata | G06K 9/00315 348/211.99 |
| 2011/0058051 A1* | 3/2011 | Jeon | G06F 3/012 348/211.11 |
| 2012/0275648 A1* | 11/2012 | Guan | H04N 5/23219 382/103 |
| 2013/0176250 A1* | 7/2013 | Lee | G06F 3/013 345/173 |
| 2013/0293488 A1* | 11/2013 | Na | G06F 3/013 345/173 |
| 2015/0130716 A1* | 5/2015 | Sridharan | G06F 3/0304 345/158 |
| 2015/0356954 A1* | 12/2015 | Lee | G16H 40/63 345/634 |
| 2015/0362729 A1* | 12/2015 | Jang | G02B 27/017 345/8 |
| 2015/0381885 A1* | 12/2015 | Kim | H04N 5/23219 348/207.1 |
| 2016/0320839 A1* | 11/2016 | Song | G06F 1/163 |
| 2016/0343229 A1* | 11/2016 | Hutchinson | G08B 21/06 |
| 2016/0349849 A1* | 12/2016 | Kwon | G06F 3/011 |
| 2017/0094156 A1* | 3/2017 | Kim | G06F 3/013 |
| 2018/0025050 A1* | 1/2018 | Yadav | G06F 17/30398 |
| 2018/0089499 A1* | 3/2018 | Sun | G06K 9/00288 |

* cited by examiner

DISPLAY CONTROLLING METHOD AND DISPLAY DEVICE

CROSS REFERENCE TO RELATED APPLICATIONS

This application is a National Stage Entry of PCT/CN2017/086116, filed on May 26, 2017, which claims priority from Chinese Patent Application 201611178597.4, filed on Dec. 19, 2016, the contents of all of which are incorporated herein by reference, in their entirety.

FIELD OF INVENTION

The present invention relates to the technical field of displays, in particular to a display controlling method and a display device.

BACKGROUND OF INVENTION

1. Description of the Related Art

As the technology and economy advance continuously, smart phones, electronic products such as tablet PCs, LCD Television, LCD screens, etc have become unprecedented, and the requirement for an intelligent control of the electronic products becomes increasingly higher.

As to the LCD televisions, watching television programs has become an indispensable part of people's daily life, so that the requirement for an intelligent display control of the television becomes higher and higher. For example, when we are watching television and become excited if there is a good television program, we would like the television to increase the volume and brightness automatically. When we are watching a boring television program and getting tired, we would like the television to switch channels automatically. When we have been watching television for a long time and our eyes are tired, we would like the television to turn down the volume and reduce the brightness. However, the conventional televisions cannot execute a corresponding operation automatically when any of the aforementioned situations occurs. Obviously, the level of intelligence of these electronic products is not high enough and the low level of intelligence affects the effect of user experience.

2. Summary of the Invention

Therefore, it is a primary objective of the present invention to overcome the drawbacks of the prior art by providing a display controlling method and a display device capable of detecting whether or not a user exists in front of a terminal according to a detection by an image sensor, and performing an intelligent display control of the terminal and the display device according to a calculated eye blink frequency of a captured image.

To achieve the aforementioned and other objectives, the present invention provides a display controlling method comprising the steps of: capturing an image in a photographic area in front of a terminal in real time; calculating a user's eye blink frequency according to the captured image; selecting a corresponding operation according to the eye blink frequency and a predetermined rule, and the predetermined rule relating to a corresponding relationship between the eye blink frequency and an operation; and controlling the terminal to execute a corresponding function according to the operation.

To achieve the aforementioned and other objectives, the present invention further provides a display device comprising: a display panel; a storage module, configured to store a program instruction; and a processing module, coupled to the display panel and the storage module, configured to call and execute the program instruction to execute the steps of: capturing an image in a photographic area in front of a terminal in real time; calculating a user's eye blink frequency according to the captured image; selecting a corresponding operation according to the eye blink frequency and a predetermined rule, and the predetermined rule relating to a corresponding relationship between the eye blink frequency and an operation; and controlling the terminal to execute a corresponding function according to the operation.

To achieve the aforementioned and other objectives, the present invention further provides a display device, comprising: a display panel; an image capturing module, configured to capture an image in a photographic area in front of a terminal in real time; a frequency calculation module, configured to calculate a user's eye blink frequency according to the captured image; an operation selection module, configured to select a corresponding operation according to the eye blink frequency and a predetermined rule, and the predetermined rule relating to a corresponding relationship between the eye blink frequency and an operation; and a control module, configured to control the terminal to execute a corresponding function according to the operation.

In a preferred embodiment of the present invention, the image sensor is provided for detecting whether or not a user exists, and the captured image is used to calculate an eye blink frequency to perform an intelligent display control of the terminal and the display device according to a predetermined rule. For example, if the eye blink frequency falls within a first frequency range, a corresponding first operation will be executed; if the eye blink frequency falls within a second frequency range, a corresponding second operation will be executed. Therefore, the intelligent control level of an electronic product with a display function can be enhanced to improve the effect of user experience.

BRIEF DESCRIPTION OF THE DRAWINGS

The above and other objects, features and advantages of this disclosure will become apparent from the following detailed description taken with the accompanying drawings. It is noteworthy that the drawings are provided for the purpose of illustrating the invention and other drawings may be obtained without any creative labor by persons having ordinary skill in the art.

DESCRIPTION OF THE PREFERRED EMBODIMENTS

It is noteworthy that the embodiments are provided for the purpose of illustrating the present invention, but not intended for limiting the scope of the invention, and this specification uses an open-ended term "comprising" meaning that the claim encompasses all the elements listed, but may also include additional unnamed elements.

In an embodiment, the terminal may be of any kind including but not limited to a terminal of a desktop computer, an LCD TV, or a digital TV with a touch sensitive surface (such as a touch screen and/or a touch panel), and it should be understood that the terminal of a preferred embodiment may be a portable communication device such as a mobile phone, a laptop computer, or a tablet PC with a touch sensitive surface (such as a touch screen and/or a touch panel).

In actual implementations, the display device may be various types of displays. For example, the display device of a preferred embodiment of the present invention includes but not limited to a display device with a plasma display screen such as an OLED display screen, an LCD screen, etc, or a cathode ray tube (CRT) display screen.

In the following description, people having ordinary skills in the art should understand that the terminal including the display device and the touch sensitive surface may be applied as a portable mobile terminal such as a notebook computer in addition to its used as a fixed device. Similarly, the terminal may also be applied to a physical keyboard, mouse, and/or joystick, or one or more of other physical peripheral devices.

The terminal supports various application programs such as one or more selected from the group consisting of graphic application program, demonstration application program, word processing application program, web site creation application program, disk engraving application program, spreadsheet application program, game application program, telephone application program, video conference application program, email application program, instant messaging application program, exercise support application program, photo management application program, digital camera application program, cam application program, web browsing application program, digital music player application program and/or digital video player application program.

Various different application programs may be executed on the terminal such as at least one physical user peripheral device with a touch sensitive surface. Adjustments may be made between application programs and/or corresponding application programs and/or one or more functions of the touch sensitive surface and the corresponding information displayed on the terminal may be changed. Therefore, the common physical architecture of the terminal (such as the touch sensitive surface) can support various user application programs.

Figure 1:
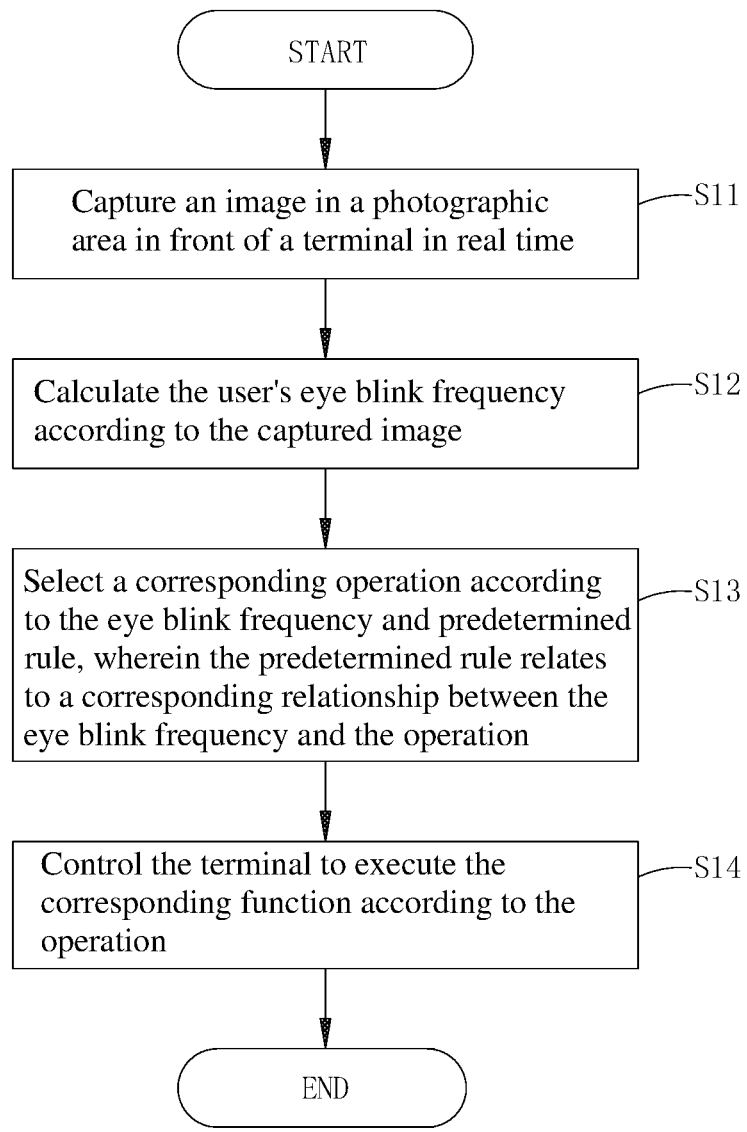
FIG. 1 is a flow chart of a display controlling method in accordance with a preferred embodiment of the present invention.

With reference to FIG. 1 for a flow chart of a display controlling method in accordance with a preferred embodiment of the present invention, the display controlling method is applied to a terminal, and the terminal has an image sensor capable of capturing an image in a photographic area in front of the terminal in real time, and the optical image is converted into an electronic signal to be transmitted to a processing module of the terminal, and then the corresponding data can be calculated. As shown in FIG. 1, the method of the invention comprises the steps S11~S14.

S11: Capture an image in a photographic area in front of a terminal in real time. Specifically, the optical image captured in real time is converted into an electronic signal, which is transmitted to a processing module of the terminal for processing. For example, if a user existed in an image within the photographic area in front of the terminal is detected, and the user blinks her/his eyes, it shows that the user is watching the terminal within the photographic area in front of the terminal. Wherein, the current using status of the terminal can be determined by the existence of the user or whether or not the user blinks her/his eyes, and the using status of the terminal includes a normal working status and a standby status.

S12: Calculate the user's eye blink frequency according to the captured image. Specifically, an eye image is fetched from the captured image in a predetermined time period, and the user's number of eye blinks within the predetermined time period is counted according to the eye image, so that the eye blink frequency can be calculated according to the user's number of eye blinks and the predetermined time period.

S13: Select a corresponding operation according to the eye blink frequency and predetermined rule, wherein the predetermined rule relates to a corresponding relationship between the eye blink frequency and the operation. Specifically, a user's eye blink frequency range is set. For example, a user's normal eye blink frequency range is set to 15 blinks per minute, and the corresponding frequency range may be set according to the normal human eye blink range by programming, and the eye blink frequency of 10~20 times per minute is set as a first frequency range, and the eye blink frequency of 1~10 times per minute is set as a second frequency range, and 10 times of ladder type accumulations is set as a frequency range. In a feasible embodiment, a user may self-define the eye blink frequency range. Therefore, a corresponding operation executed by the terminal may be selected according to the eye blink frequency range and the predetermined rule. If the user's eye blink frequency falls within the first frequency range, the terminal will execute a first operation; and if the user's eye blink frequency falls within the second frequency range, the terminal will execute a second operation. For example, if the eye blink frequency falls within the first frequency range, the first operation of the corresponding terminal may be set according to the functional operation of the terminal, wherein the first operation may be an operation for automatically switching the current applying scene or playing channel of the terminal, or automatically adjusting the brightness. If the eye blink frequency falls within the second frequency range, the terminal will execute the second operation, wherein the second operation may be an operation for automatically tuning up or down the volume or adjusting the contrast. In a feasible embodiment, a user may self-define the predetermined rule for the corresponding operation within the eye blink frequency range according to personal preference.

S14: Control the terminal to execute the corresponding function according to the operation. Specifically, the operation may be executed by the terminal according to the eye blink frequency and the predetermined rule, and the terminal may be controlled to execute the corresponding function according to the operation. For example, if a user falls into sleep accidentally while watching a video on the terminal, the eye blink frequency is zero, so that the terminal is controlled to enter into a standby mode. When the user wakes up, the eye blink frequency is calculated, and the volume of the terminal may be turned down if the eye blink frequency is too low, or the channel of the terminal may be controlled and switched if the eye blink frequency is too high. Therefore, the working status of the intelligent control terminal is implemented to guarantee the display of the intelligent control terminal, facilitate the use by users, and achieve the effects of improving the level of user experience, and saving power and resources. In addition, the invention further allows users to set the corresponding function and operation according to the user's preference.

In the above preferred embodiment, the captured image calculated according to the eye blink frequency and the predetermined rule is used for performing the corresponding operation to guarantee the intelligent control of the display of the terminal and improve the user experience. In the above preferred embodiment, the corresponding operation of the terminal display can be performed according to the eye blink frequency range and predetermined rule within the predetermined time period. For example, if the calculated user's eye blink frequency falls within a first frequency range, the terminal will execute a first operation; and if the calculated user's eye blink frequency falls within a second frequency range, the terminal will execute a second operation. Therefore, the operation executed by the terminal can be carried out according to the eye blink frequency range dynamically to improve the user experience when viewing at a video. In addition, the above preferred embodiment further allows users to self-define the corresponding relationship between the eye blink frequency and the operation.

Figure 2:
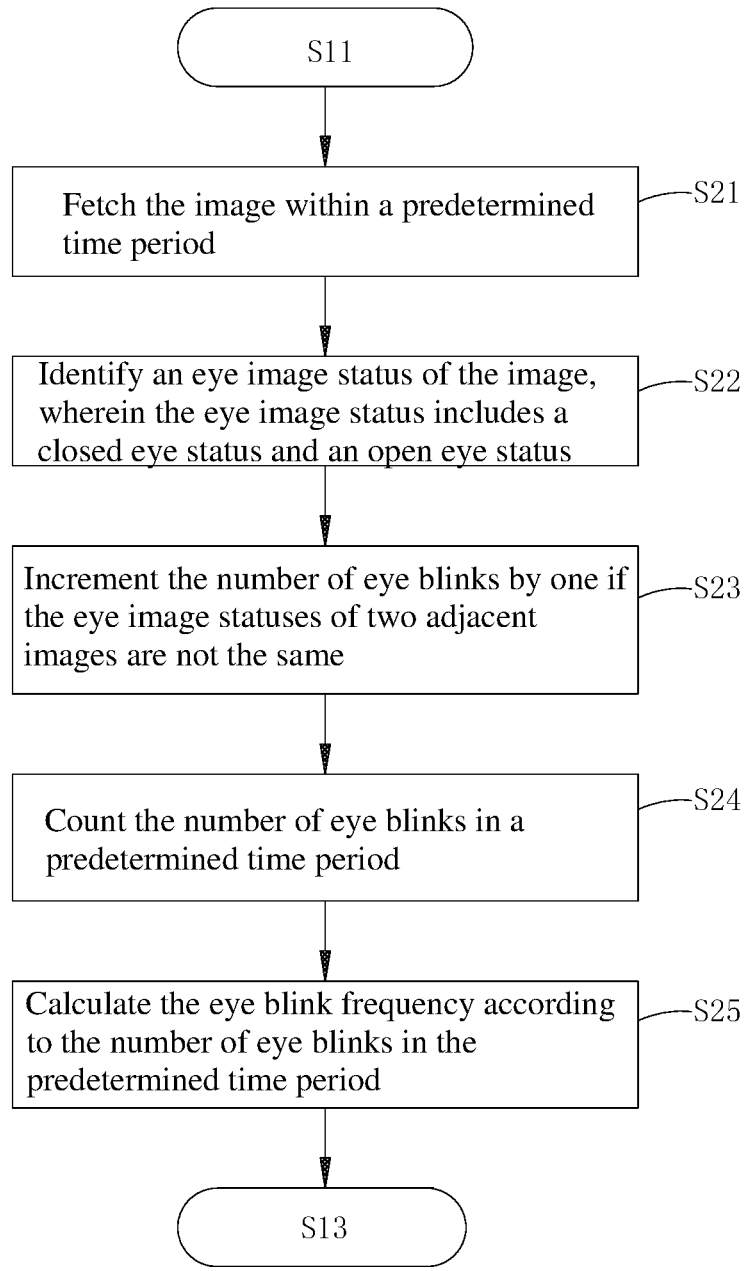
FIG. 2 is a sub flow chart of a display controlling method in accordance with a preferred embodiment of the present invention.

With reference to FIG. 2 for a sub flow chart of Step S12 in accordance with the first preferred embodiment of the present invention, the user's eye blink frequency is calculated according to captured image. Specifically, the step S12 further comprises the steps S21~S25.

S21: Fetch the image within a predetermined time period. Specifically, the predetermined time period may be set by users.

S22: Identify an eye image status of the image, wherein the eye image status includes a closed eye status and an open eye status. Specifically, the eye image status of the image can be identified according to the characteristics information of the eye. For example, the information with regard to the shape of the pupil of a user's eye and limbus (iris and sclera) can be identified and processed by programming, so that when the user's eye image status is the open eye status, the eye characteristics information such as the shape of the pupil of the eye and limbus can be identified; and when user's eye image status is the closed eye status, the corresponding eye characteristics information cannot be identified.

S23: Increment the number of eye blinks by one if the eye image statuses of two adjacent images are not the same. Specifically, the identified eye image status of the image is compared. If the eye image statuses of two images in two adjacent time points are not the same, the number of eye blinks is incremented by one.

S24: Count the number of eye blinks in a predetermined time period. Specifically, the number of eye blinks can be counted and compared according to the eye image status of the image within the predetermined time, so as to count the number of eye blinks in the predetermined time period.

S25: Calculate the eye blink frequency according to the number of eye blinks in the predetermined time period.

In the above preferred embodiment, a corresponding comparison is performed according to the identified eye image status of the image in the predetermined time, and the number of eye blinks in the predetermined time period is counted in order to calculate the eye blink frequency in the predetermined time period.

Figure 3:
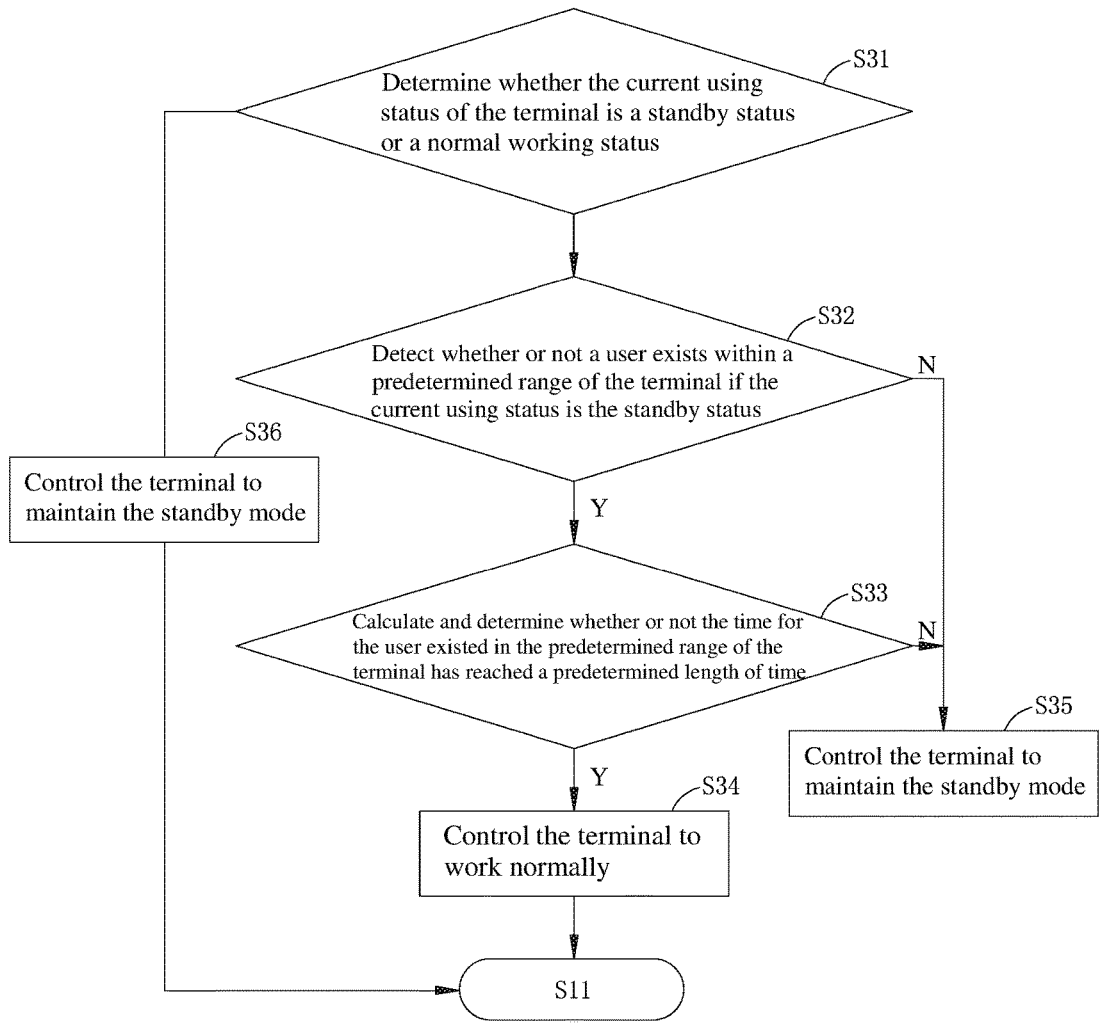
FIG. 3 is another sub flow chart of a display controlling method in accordance with a preferred embodiment of the present invention.

With reference to FIG. 3 for another sub flow chart of a display controlling method in accordance with the second preferred embodiment of the present invention, the display controlling method comprises Steps S31~S36.

S31: Determine whether the current using status of the terminal is a standby status or a normal working status. If the terminal is situated in a standby status, go to Step S32; and if the terminal is situated in a normal working status, go to Step S36. Specifically, the current using status of the terminal includes a standby status and a normal working status.

S32: Detect whether or not a user exists within a predetermined range of the terminal if the current using status is the standby status. If the user shows up in the terminal, then go to Step S33, or else go to Step S35. Specifically, determining whether or not a user exists within the predetermined range of the terminal can position a user's body image according to the image generated by the image sensor, so that the user's existence can be detected. In a feasible embodiment, an infrared sensor may be installed to the terminal, so that the user's existence can be detected by the infrared sensor when the user enters into the predetermined range of the terminal.

S33: Calculate and determine whether or not the time for the user existed in the predetermined range of the terminal has reached a predetermined length of time. If yes, then go to Step S34, or else go to Step S35. Specifically, if the user's existence is detected in the predetermined range of the terminal, the timing module will start working. In a feasible embodiment, the predetermined length of time may be set by users, so as to avoid the situation when the user enters into the predetermined range of the terminal and then suddenly leaves the predetermined range of the terminal.

S34: Control the terminal to work normally. Specifically, when the terminal is situated at the normal working status, the image within the photographic area in front of the terminal is captured in real time.

S35: Control the terminal to maintain the standby mode.

S36: Capture an image within the photographic area in front of the terminal in real time when the terminal is situated at the normal working status. Specifically, when the terminal is situated at the normal working status, the image within the photographic area in front of the terminal in real time is captured in real time.

In the above preferred embodiment, the using status of the terminal is controlled intelligently by detecting the user's existence and whether or not the time of detecting the user has reached the predetermined length of time, so as to improve the intelligent control performance of the terminal and prevent affecting the user experience. It is understood that if the terminal is situated at the standby status, the image sensor or infrared sensor is working all the time. Once if the user's existence is detected within the photographic area in front of the terminal and the predetermined length of time has reached, then the terminal will switch the standby status to the normal working status. In another preferred embodiment, the user may manually press a key to set the terminal to the normal working status. In the above preferred embodiment, the using status of the terminal can be switched automatically, wherein the using status of the terminal includes a standby status and a normal working status.

In a feasible embodiment, the Step S12 of the first preferred embodiment may be combined with the procedure of the second preferred embodiment. For example, if the terminal is situated at the normal working status, the method of the first preferred embodiment may be used for calculating the eye blink frequency range to confirm the corresponding operation executed by the terminal.

Figure 4:
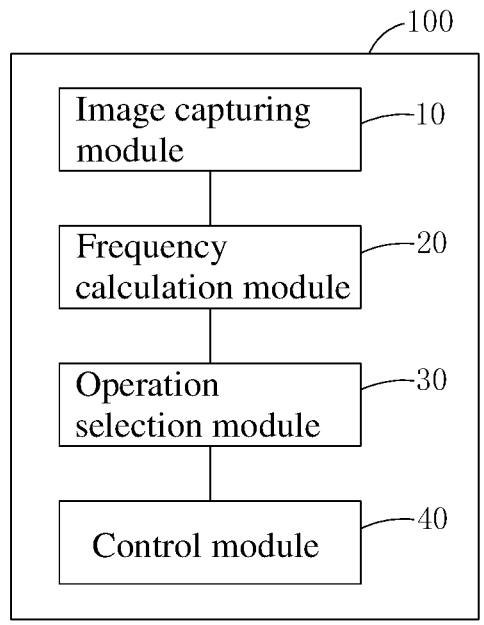
FIG. 4 is a schematic block diagram of a terminal in accordance with a preferred embodiment of the present invention.

With reference to FIG. 4 for a schematic block diagram of a terminal 100 in accordance with a preferred embodiment of the present invention, the terminal 100 comprises an image capturing module 10, a frequency calculation module 20, an operation selection module 30, and a control module 40.

The image capturing module 10 is configured to capture an image generated by the image sensor and occurred within the photographic area in front of the terminal in real time. Specifically, the optical image captured in real time is converted into an electronic signal which is transmitted to a processing module of the terminal for the corresponding processing. For example, when a user's existence is detected in the image captured within the photographic area in front of the terminal, and the user's eye is blinking, it shows that the user detected within the photographic area in front of the terminal is viewing at the terminal. Wherein, the current using status of the terminal can be confirmed by the user's existence and user's eye blink, and the using status of the terminal includes a normal working status and a standby status.

The frequency calculation module 20 is configured to calculate the user's eye blink frequency according to the captured image. Specifically, an eye image is fetched from the captured image within the predetermined time period, and the user's number of eye blinks is counted according to the predetermined time period, so that the eye image can be calculated, and the eye blink frequency can be calculated according to the user's number of eye blinks and the predetermined time period.

Figure 6:
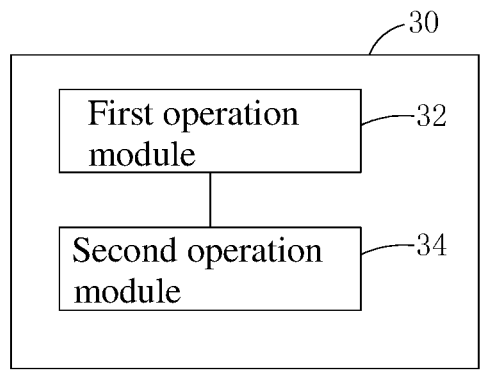
FIG. 6 is a schematic block diagram of an operation selection module of a terminal in accordance with a first preferred embodiment of the present invention.

The operation selection module 30 is configured to select a corresponding operation according to the eye blink frequency and the predetermined rule, wherein the predetermined rule relates to a corresponding relationship between the eye blink frequency and the operation, and the operation selection module 30 comprises a first operation module 32 and a second operation module 34 (as shown in FIG. 6). Specifically, the user's eye blink frequency range is set. For example, the user's normal eye blink frequency range is set to 15 blinks per minute, and the corresponding frequency range may be set according to the normal human eye blink range by programming, and the eye blink frequency of 10~20 times per minute is set as a first frequency range, and the eye blink frequency of 1~10 times per minute is set as a second frequency range, and 10 times of ladder type accumulations is set as a frequency range. In a feasible embodiment, a user may self-define the eye blink frequency range. Therefore, a corresponding operation executed by the terminal may be selected according to the eye blink frequency range and the predetermined rule. If the calculated user's eye blink frequency falls within a first frequency range, the terminal will execute a first operation; and if the calculated user's eye blink frequency falls within a second frequency range, the terminal will execute a second operation. For example, if the eye blink frequency falls within the first frequency range, the first operation of the corresponding terminal may be set according to the functional operation of the terminal, wherein the first operation may be an operation for automatically switching the current applying scene or playing channel of the terminal, or automatically adjusting the brightness. If the eye blink frequency falls within the second frequency range, the terminal will execute the second operation, wherein the second operation may be an operation for automatically tuning up or down the volume or adjusting the contrast. In a feasible embodiment, a user may self-define the predetermined rule for the corresponding operation within the eye blink frequency range according to personal preference.

The control module 40 is configured to control the terminal to execute the corresponding function according to the operation. Specifically, the operation may be executed by the terminal according to the eye blink frequency and the predetermined rule, and the terminal may be controlled to execute the corresponding function according to the operation. For example, if a user falls into sleep accidentally while watching a video on the terminal, the eye blink frequency is zero, so that the terminal is controlled to enter into a standby mode. When the user wakes up, the eye blink frequency is calculated, and the volume of the terminal may be turned down if the eye blink frequency is too low, or the channel of the terminal may be controlled and switched if the eye blink frequency is too high. Therefore, the working status of the intelligent control terminal is implemented to guarantee the display of the intelligent control terminal, facilitate the use by users, and achieve the effects of improving the level of user experience, and saving power and resources. In addition, the invention further allows users to set the corresponding function and operation according to user's preference.

In the above preferred embodiment, the captured image calculated according to the eye blink frequency and the predetermined rule is used for performing the corresponding operation to guarantee the intelligent control of the display of the terminal and improve the user experience. In the above preferred embodiment, the corresponding operation of the terminal display can be performed according to the eye blink frequency range and predetermined rule within the predetermined time period. For example, if the calculated user's eye blink frequency falls within a first frequency range, the terminal will execute a first operation; and if the calculated user's eye blink frequency falls within a second frequency range, the terminal will execute a second operation. Therefore, the operation executed by the terminal can be carried out according to the eye blink frequency range dynamically to improve the user experience when viewing at a video. In addition, the above preferred embodiment further allows users to self-define the corresponding relationship between the eye blink frequency and the operation.

Figure 5:
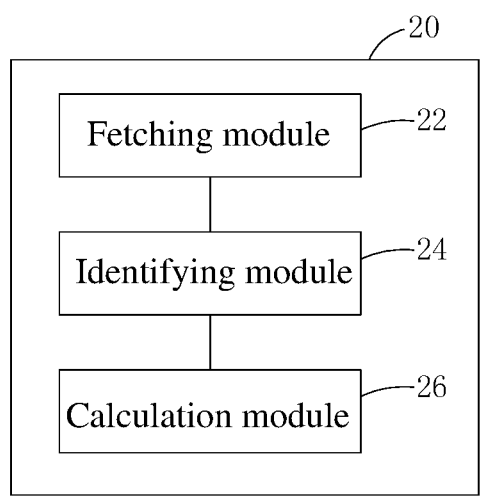
FIG. 5 is a schematic block diagram of a frequency calculation module of a terminal in accordance with a preferred embodiment of the present invention.

With reference to FIG. 5 for a schematic block diagram of a frequency calculation module 20 in accordance with a preferred embodiment of the present invention, the frequency calculation module 20 calculates the user's eye blink frequency according to the captured image. Specifically, the frequency calculation module 20 comprises a fetching module 22, an identifying module 24, and a calculation module 26.

The fetching module 22 is configured to fetch the image in a predetermined time period. Specifically, the predetermined time period may be set by users.

The identifying module 24 is configured to identify an eye image status in the image, wherein the eye image status includes a closed eye status and an open eye status. Specifically, the eye image status of the image can be identified according to the characteristics information of the eye. For example, the information with regard to the shape of the pupil of a user's eye and limbus (iris and sclera) can be identified and processed by programming, so that when the user's eye image status is the open eye status, the eye characteristics information such as the shape of the pupil of the eye and limbus can be identified; and when user's eye image status is the closed eye status, the corresponding eye characteristics information cannot be identified.

The calculation module 26 is configured to increment the number of eye blinks by one if the eye image status of two adjacent images is not the same. Specifically, the calculation module 26 compares the identified eye image status in the image, and if the eye image statuses of two images in two adjacent time points are not the same, then the number of eye blinks is incremented by one.

The calculation module 26 is provided for counting the number of eye blinks in a predetermined time period. Specifically, the counted number of eye blinks is compared according to the eye image status of the image in the predetermined time in order to count the number of eye blinks in the predetermined time period.

The calculation module 26 is also configured to calculate the eye blink frequency according to the counted number of eye blinks and the predetermined time period.

In the above preferred embodiment, a corresponding comparison is performed according to the identified eye image status of the image in the predetermined time period and the number of eye blinks in the predetermined time period is counted, so that the eye blink frequency in the predetermined time period can be calculated.

Figure 7:
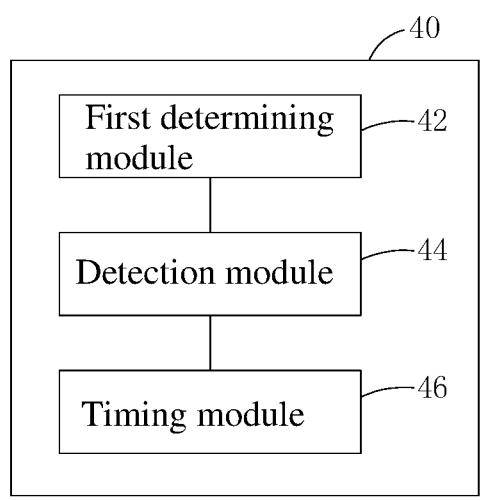
FIG. 7 is a schematic block diagram of a control module of a terminal in accordance with a second preferred embodiment of the present invention.

With reference to FIG. 7 for a schematic block diagram of a control module 40 in accordance with a preferred embodiment of the present invention, the control module 49 uses the using status of the terminal controlled intelligently to detect the user's existence and whether or not the time of detecting the user has reached the predetermined length of time, so as to improve the intelligent control performance of the terminal and prevent affecting the user experience. Specifically, the control module 40 comprises a first determining module 42, a detection module 44, and a timing module 46.

The first determining module 42 is configured to determine whether the terminal is currently situated at the standby status or the normal working status. Specifically, the current using status of the terminal includes a standby status and a normal working status.

The detection module 44 is configured to detect whether or not a user exists within the predetermined range of the terminal when the current using status of the terminal is the standby status. Specifically, the confirmation of the user's existence in the predetermined range of the terminal can position the user's body image according to the image generated by the image sensor, so that the user's existence can be detected. In a feasible embodiment, an infrared sensor may be installed to the terminal, so that the user's existence can be detected by the infrared sensor when the user enters into the predetermined range of the terminal.

The timing module 46 is configured to calculate and determining whether or not the time of the user existing in the predetermined range of predetermined range has reached a predetermined length of time. Specifically, if the user's existence is detected within the predetermined range of the terminal, the timing module will start working. In a feasible embodiment, the predetermined length of time may be set by users, so as to avoid the situation when the user enters into the predetermined range of the terminal and then suddenly leaves the predetermined range of the terminal.

The control module 40 is configured to control the terminal to work normally. Specifically, when the terminal is situated at the normal working status, the image within the photographic area in front of the terminal is captured in real time.

The control module 40 is configured to control the terminal to be maintained at the standby mode.

In the above preferred embodiment, the using status of the terminal is controlled intelligently by detecting the user's existence and whether or not the time of detecting the user has reached the predetermined length of time, so as to improve the intelligent control performance of the terminal and prevent affecting the user experience. It is understood that if the terminal is situated at the standby status, the image sensor or infrared sensor is working all the time. Once if the user's existence is detected within the photographic area in front of the terminal and the predetermined length of time has reached, then the terminal will switch the standby status to the normal working status. In another preferred embodiment, the user may manually press a key to set the terminal to the normal working status. In the above preferred embodiment, the using status of the terminal can be switched automatically, wherein the using status of the terminal includes a standby status and a normal working status.

The first determining module 42 is configured to determine whether or not the terminal is currently situated at the normal working status. Specifically, if the terminal is situated at the normal working status, the capture of an image within the photographic area in front of the terminal will be executed in real time.

In the above preferred embodiment, the using status of the terminal is controlled intelligently by detecting the user's existence and whether or not the time of detecting the user has reached the predetermined length of time, so as to improve the intelligent control performance of the terminal and prevent affecting the user experience. It is understood that if the terminal is situated at the standby status, the image sensor or infrared sensor is working all the time. Once if the user's existence is detected within the photographic area in front of the terminal and the predetermined length of time has reached, then the terminal will switch the standby status to the normal working status. In another preferred embodiment, the user may manually press a key to set the terminal to the normal working status. In the above preferred embodiment, the using status of the terminal can be switched automatically, wherein the using status of the terminal includes a standby status and a normal working status.

In a feasible embodiment, the Step S12 of the first preferred embodiment may be combined with the procedure of the second preferred embodiment. For example, if the terminal is situated at the normal working status, the method of the first preferred embodiment may be used for calculating the eye blink frequency range to confirm the corresponding operation executed by the terminal.

Figure 8:
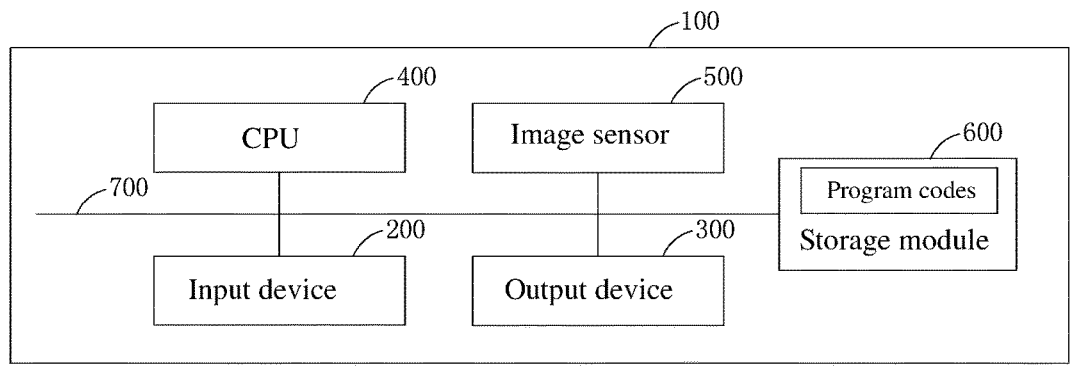
FIG. 8 is a schematic block diagram of users of a terminal in accordance with a preferred embodiment of the present invention.

With reference to FIG. 8 for a schematic block diagram of a terminal in accordance with a preferred embodiment of the present invention, which may be another preferred embodiment of the display device of the invention, the terminal 100 comprises at least one input device 200, at least one output device 300, and at least one processing module (CPU) 400, an image sensor 500, and a storage module 600. The input device 200, output device 300, processing module 400, image sensor 500, and storage module 600 are connected through a bus 700.

The input device 200 is a touch panel (or touch screen), a physical press key, a fingerprint identifying module, or a mouse.

The output device 300 is a display screen.

The storage module 600 is a high speed RAM storage module, or a non-volatile storage module (non-volatile memory) such as a disk storage module. The aforementioned storage module 600 is configured to store a set of program codes, and the input device 200, output device 300 and processing module 400 are provided for retrieving the program codes stored in the storage module 600, and the terminal will execute the following operations.

The processing module 400 is provided for carrying out the following steps:

Capture an image within the photographic area in front of the terminal and generated by the image sensor. Specifically, if a user existed in an image within the photographic area in front of the terminal is detected, and the user blinks her/his eyes, it shows that the user is watching the terminal within the photographic area in front of the terminal. Wherein, the current using status of the terminal can be determined by the existence of the user or whether or not the user blinks her/his eyes.

Calculate the user's eye blink frequency according to the captured image. Specifically, the eye image is fetched from the captured image within a predetermined time period. Count the user's number of eye blinks of the eye image according to the predetermined time period. Therefore, the eye blink frequency can be calculated according to the user's number of eye blinks and the predetermined time period.

Select a corresponding operation according to the eye blink frequency and a predetermined rule, wherein the predetermined rule relates to a corresponding relationship between the eye blink frequency and the operation. Specifically, the user's eye blink frequency range is set. For example, the user's normal eye blink frequency range is set to 15 blinks per minute, and the corresponding frequency range may be set according to the normal human eye blink range by programming, and the eye blink frequency of 10~20 times per minute is set as a first frequency range, and the eye blink frequency of 1~10 times per minute is set as a second frequency range, and 10 times of ladder type accumulations is set as a frequency range. In a feasible embodiment, a user may self-define the eye blink frequency range. Therefore, a corresponding operation executed by the terminal may be selected according to the eye blink frequency range and the predetermined rule. If the user's eye blink frequency falls within the first frequency range, the terminal will execute a first operation; and if the user's eye blink frequency falls within the second frequency range, the terminal will execute a second operation. For example, if the eye blink frequency falls within the first frequency range, the first operation of the corresponding terminal may be set according to the functional operation of the terminal, wherein the first operation may be an operation for automatically switching the current applying scene or playing channel of the terminal, or automatically adjusting the brightness. If the eye blink frequency falls within the second frequency range, the terminal will execute the second operation, wherein the second operation may be an operation for automatically tuning up or down the volume or adjusting the contrast. In a feasible embodiment, a user may self-define the predetermined rule for the corresponding operation within the eye blink frequency range according to personal preference.

Control the terminal to execute a corresponding function according to the operation. Specifically, the operation may be executed by the terminal according to the eye blink frequency and the predetermined rule, and the terminal may be controlled to execute the corresponding function according to the operation. For example, if a user falls into sleep accidentally while watching a video on the terminal, the eye blink frequency is zero, so that the terminal is controlled to enter into a standby mode. When the user wakes up, the eye blink frequency is calculated, and the volume of the terminal may be turned down if the eye blink frequency is too low, or the channel of the terminal may be controlled and switched if the eye blink frequency is too high. Therefore, the working status of the intelligent control terminal is implemented to guarantee the display of the intelligent control terminal, facilitate the use by users, and achieve the effects of improving the level of user experience, and saving power and resources. In addition, the invention further allows users to set the corresponding function and operation according to the user's preference.

In the above preferred embodiment, the captured image calculated according to the eye blink frequency and the predetermined rule is used for performing the corresponding operation to guarantee the intelligent control of the display of the terminal and improve the user experience. In the above preferred embodiment, the corresponding operation of the terminal display can be performed according to the eye blink frequency range and predetermined rule within the predetermined time period. For example, if the calculated user's eye blink frequency falls within a first frequency range, the terminal will execute a first operation; and if the calculated user's eye blink frequency falls within a second frequency range, the terminal will execute a second operation. Therefore, the operation executed by the terminal can be carried out according to the eye blink frequency range dynamically to improve the user experience when viewing at a video. In addition, the above preferred embodiment further allows users to self-define the corresponding relationship between the eye blink frequency and the operation.

Further, the processing module 400 calculates the user's eye blink frequency, according to the captured image. Specifically, the processing module 400 performs the following steps:

Fetch the image in the predetermined time period. Specifically, the predetermined time period may be set by users.

Identify the eye image status of the image, wherein the eye image status includes a closed eye status and an open eye status. Specifically, the eye image status of the image can be identified according to the characteristics information of the eye. For example, the information with regard to the shape of the pupil of a user's eye and limbus (iris and sclera) can be identified and processed by programming, so that when the user's eye image status is the open eye status, the eye characteristics information such as the shape of the pupil of the eye and limbus can be identified; and when user's eye image status is the closed eye status, the corresponding eye characteristics information cannot be identified.

If the eye image statuses of two adjacent images are not the same, then the number of eye blinks will be incremented by one. Specifically, the identified eye image status of the image is compared, and if the eye image statuses of two adjacent images are not the same, then the number of eye blinks will be incremented by one.

Calculate the number of eye blinks in the predetermined time period. Specifically, the counted number of eye blinks is compared according to the eye image status in the predetermined time, so that the number of eye blinks in the predetermined time period can be counted.

Calculate the eye blink frequency according to the counted number of eye blinks and the predetermined time period.

In the above preferred embodiment, a corresponding comparison is performed according to the identified eye image status of the image in the predetermined time period, and the number of eye blinks in the predetermined time period is counted, so that the eye blink frequency of the predetermined time period can be calculated.

Further, the processing module 400 controls the terminal intelligently by detecting the user's existence and by determining whether or not the time of detecting the user has reached a predetermined length of time, so as to achieve the effects of improving the intelligent control performance of the terminal, and preventing the user experience from being affected. Specifically, the processing module 400 is used to carry out the following steps:

Determine whether the current using status of the terminal is a standby status or a normal working status. Specifically, the current using status of the terminal includes a standby status and a normal working status. If the current using status of the terminal is the standby status, a user existed within a predetermined range of the terminal will be detected. Specifically, the user's existence in the predetermined range of the terminal can position the user's body image according to the image generated by the image sensor, so that the user's existence can be detected. In a feasible embodiment, an infrared sensor may be installed to the terminal, so that the user's existence can be detected by the infrared sensor when the user enters into the predetermined range of the terminal.

Determine whether of not the time of a user existing in the predetermined range of the terminal has reached a predetermined length of time. Specifically, if the user's existence is detected in the predetermined range of the terminal, the timing module will start working. In a feasible embodiment, the predetermined length of time may be set by users, so as to avoid the situation when the user enters into the predetermined range of the terminal and then suddenly leaves the predetermined range of the terminal.

Control the terminal to work normally. Specifically, when the terminal is situated at the normal working status, an image within the photographic area in front of the terminal will be captured.

Control the terminal to maintain the standby mode, if the terminal is currently situated at the normal working status. Specifically, when the terminal is situated at the normal working status, an image within the photographic area in front of the terminal will be captured.

In the above preferred embodiment, the using status of the terminal is controlled intelligently by detecting the user's existence and whether or not the time of detecting the user has reached the predetermined length of time, so as to improve the intelligent control performance of the terminal and prevent affecting the user experience. It is understood that if the terminal is situated at the standby status, the image sensor or infrared sensor is working all the time. Once if the user's existence is detected within the photographic area in front of the terminal and the predetermined length of time has reached, then the terminal will switch the standby status to the normal working status. In another preferred embodiment, the user may manually press a key to set the terminal to the normal working status. In the above preferred embodiment, the using status of the terminal can be switched automatically, wherein the using status of the terminal includes a standby status and a normal working status.

In a feasible embodiment, the Step S12 of the first preferred embodiment may be combined with the procedure of the second preferred embodiment. For example, if the terminal is situated at the normal working status, the method of the first preferred embodiment may be used for calculating the eye blink frequency range to confirm the corresponding operation executed by the terminal.

Figure 9:
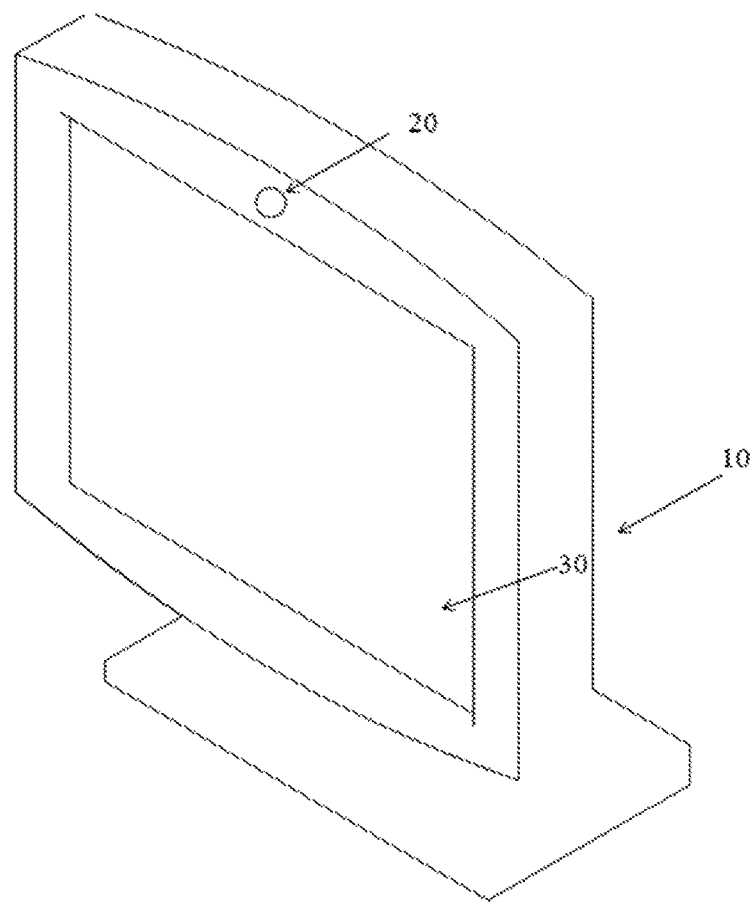
FIG. 9 is a schematic block diagram of a display device in accordance with a second preferred embodiment of the present invention.

With reference to FIG. 9 for a schematic block diagram of a display device 10 in accordance with a preferred embodiment of the present invention, the display device 10 comprises a display screen 30 and an image sensor, and the display screen 30 is provided for displaying an image screen; and the display device 10 further comprises:

an image capturing module, configured to capture an image in a photographic area in front of a terminal;

a frequency calculation module, configured to calculate a user's eye blink frequency according to the captured image;

an operation selection module, configured to select a corresponding operation according to the eye blink frequency and a predetermined rule, wherein the predetermined rule relates to a corresponding relationship between the eye blink frequency and an operation; and a control module, configured to control the terminal to execute a corresponding function according to the operation.

In a preferred embodiment of the present invention, the display device 10 includes but not limited to a display device 10 having a display screen such as an OLED display screen, an LCD screen, a plasma display screen, and a cathode ray tube (CRT) display screen.

The display device 10 is integrally formed all around, and the non-display area of the display device 10 has an installation hole 20 for installing an image sensor, so that the image sensor may be installed into the installation hole 20, wherein the image sensor includes but not limited to a camera head, a CCD, and a CMOS, and the image sensor is configured to capture an image within a photographic area in front of the display screen 30 in real time.

The display screen 30 includes but not limited to an OLED display screen, an LCD screen, a plasma display screen, and a cathode ray tube (CRT) display screen. The display screen 30 has a TFT substrate and a color film substrate, and a liquid crystal layer installed between the TFT substrate and the color film substrate, and the display screen 30 is provided for displaying the image screen.

The installation hole 20 is formed on a vertical line of the non-display area of the display device 10, and the image sensor may be fixed into the installation hole 20 by silicone.

In a feasible embodiment, there may be a plurality of image sensors of the display device 10, so that there may be a plurality of installation holes 20 which are configured to be corresponsive to the image sensors respectively. In addition, one installation hole 20 may correspond to a plurality of image sensors.

In the above preferred embodiment, the user's existence may be detected by the image sensor, and the captured image is used to calculate the eye blink frequency, and the display device is controlled intelligently according to the predetermined rule. For example, if the eye blink frequency falls within a first frequency range, the display device will execute a first operation; and if the eye blink frequency falls within a second frequency range, the display device will execute a second operation, so as to improve the intelligent control level of the display device and also improve the user experience.

Persons having ordinary skill in the art should know that the module and algorithm disclosed in the preferred embodiments of the present invention may be achieved by electronic hardware, computer software, or a combination of the two. It is noteworthy that the description of hardware and the description of software are interchangeable, and the assembly and steps of each embodiment are generally described according to their functions. These functions may be executed by hardware or software, depending on specific applications and design conditions of the technical solutions. Professional technical people can use different method for each specific application to achieve the aforementioned functions. However, such implements should not exceed the scope of the present invention.

It is noteworthy that persons having ordinary skill in the art should be able to understand that we can refer to the above description of the display method of the preferred embodiment for the description of the terminal and modules of the invention, and thus their description will not be repeated.

In the foregoing preferred embodiments of the present invention, it is understood that the disclosed terminal and method may be implemented by other methods, and the device described in the preferred embodiments are illustrative rather than restrictive. For example, the terminal and display device are divided into modules which are just a division by logical functions, and the actual implementation of the invention may have other division methods such as combining a plurality of modules or components, or integrating the modules and components into another systems, or some characteristics may be ignored or even not exercised. In addition, the mutual coupling, direct coupling, or telecommunicative connection may be indirect coupling or telecommunicative connection through a certain interface, device or module, and they may be electrically coupled, mechanically coupled, or coupled in any other form.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display controlling method, comprising the steps of:
   capturing an image in a photographic area in front of a terminal in real time;
   calculating a user's eye blink frequency according to the captured image;
   selecting a corresponding operation according to the eye blink frequency and a predetermined rule, and the predetermined rule relating to a corresponding relationship between the eye blink frequency and an operation; and
   controlling the terminal to execute a corresponding function according to the operation;
   wherein the step of calculating the user's eye blink frequency according to captured image comprises the steps of:
   fetching the image in a predetermined time period;
   identifying an eye image status in the image, and the eye image status including a closed eye status and an open eye status;
   incrementing the number of eye blinks by one, if the eye image status of two adjacent images is not the same;
   counting the number of eye blinks in the predetermined time period; and
   calculating the eye blink frequency according to the counted number of eye blinks and the predetermined time period.

2. The method as claimed in claim 1, wherein the step of executing the predetermined rule relating to a corresponding relationship between the eye blink frequency and the operation comprises the steps of:
   executing a first operation by the terminal, if the eye blink frequency falls within a first frequency range; and
   executing a second operation by the terminal, if the eye blink frequency falls within a second frequency range.

3. The method as claimed in claim 1, further comprising the steps of:
   determining whether the current using status of the terminal is a standby status or a normal working status;
   detecting whether a user exists within a predetermined range of the terminal, if the current using status of the terminal is the standby status; and
   calculating and determining whether the time of using memory within the predetermined range of the terminal has reached a predetermined length of time; and
   controlling the terminal to enter into the normal working status and execute the image captured within the photographic area in front of the terminal in real time, if the predetermined length of time is reached.

4. The method as claimed in claim 3, wherein the step of executing the predetermined rule relating to a corresponding relationship between the eye blink frequency and the operation comprises the steps of:
   executing a first operation by the terminal, if the eye blink frequency falls within a first frequency range; and
   executing a second operation by the terminal, if the eye blink frequency falls within a second frequency range.

5. A display device, comprising:
   a display panel;
   a storage module, configured to store a program instruction; and
   a processing module, coupled to the display panel and the storage module, configured to call and execute the program instruction to execute the steps of:
   capturing an image in a photographic area in front of a terminal in real time;
   calculating a user's eye blink frequency according to the captured image;
   selecting a corresponding operation according to the eye blink frequency and a predetermined rule, and the predetermined rule relating to a corresponding relationship between the eye blink frequency and an operation; and
   controlling the terminal to execute a corresponding function according to the operation;
   wherein the step of calculating the user's eye blink frequency according to captured image comprises the steps of:
   fetching the image in a predetermined time period;
   identifying an eye image status in the image, and the eye image status including a closed eye status and an open eye status;
   incrementing the number of eye blinks by one, if the eye image status of two adjacent images is not the same;
   counting the number of eye blinks in the predetermined time period; and
   calculating the eye blink frequency according to the counted number of eye blinks and the predetermined time period.

6. The display device as claimed in claim 5, wherein the step for the processing module to execute the predetermined rule relating a corresponding relationship between the eye blink frequency and the operation comprises the steps of:
   executing a first operation by the terminal, if the eye blink frequency falls within a first frequency range; and
   executing a second operation by the terminal, if the eye blink frequency falls within a second frequency range.

7. The display device as claimed in claim 5, wherein the step for the processing module to call and execute the program instruction comprises the steps of:

determining whether the current using status of the terminal is a standby status or a normal working status;

detecting whether a user exists within a predetermined range of the terminal, if the current using status of the terminal is the standby status; and calculating and determining whether the time of using memory within the predetermined range of the terminal has reached a predetermined length of time; and controlling the terminal to enter into the normal working status and execute the image captured within the photographic area in front of the terminal in real time, if the predetermined length of time is reached.

8. The display device as claimed in claim 7, wherein the step for the processing module to execute the predetermined rule relating to a corresponding relationship between the eye blink frequency and the operation comprises the steps of:

executing a first operation by the terminal, if the eye blink frequency falls within a first frequency range; and executing a second operation by the terminal, if the eye blink frequency falls within a second frequency range.

9. A display device, comprising:

a display panel;

an image capturing module, configured to capture an image in a photographic area in front of a terminal in real time;

a frequency calculation module, configured to calculate a user's eye blink frequency according to the captured image;

an operation selection module, configured to select a corresponding operation according to the eye blink frequency and a predetermined rule, and the predetermined rule relating to a corresponding relationship between the eye blink frequency and an operation; and a control module, configured to control the terminal to execute a corresponding function according to the operation;

wherein the frequency calculation module comprises:

a fetching module, configured to fetch the image in a predetermined time period;

an identifying module, configured to identify an eye image status in the image, and the eye image status including a closed eye status and an open eye status;

a calculation module, configured to increment the number of eye blinks by one if the eye image status of two adjacent images is not the same, count the number of eye blinks in a predetermined time period, and calculate the eye blink frequency according to the counted number of eye blinks and the predetermined time period.

10. The display device as claimed in claim 9, wherein the operation selection module comprises:

a first operation module, configured to execute a first operation by the terminal, if the eye blink frequency falls within a first frequency range; and a second operation module, configured to execute a second operation by the terminal, if the eye blink frequency falls within a second frequency range.

11. The display device as claimed in claim 9, wherein the control module comprises:

a first determining module, configured to determine whether the current using status of the terminal is a standby status or a normal working status;

a detection module, configured to detect whether or not a user exists in the predetermined range of the terminal if the terminal is situated at the standby status; and a timing module, configured to calculate and determining whether the time of using memory within the predetermined range of the terminal has reached a predetermined length of time;

wherein the control module is configured to control the terminal to enter into the normal working status and execute the image captured within the photographic area in front of the terminal in real time, if the predetermined length of time is reached.

12. The display device as claimed in claim 9, wherein the control module comprises:

a first determining module, configured to determine whether the current using status of the display device is a standby status or a normal working status;

a detection module, configured to detect whether or not a user exists in the predetermined range of the terminal if the terminal is situated at the standby status; and a timing module, configured to calculate and determining whether the time of using memory within the predetermined range of the terminal has reached a predetermined length of time.

13. The display device as claimed in claim 12, wherein the operation selection module comprises:

a first operation module, configured to execute a first operation by the terminal, if the eye blink frequency falls within a first frequency range; and a second operation module, configured to execute a second operation by the terminal, if the eye blink frequency falls within a second frequency range.

14. The display device as claimed in claim 13, wherein the control module is configured to control the terminal to enter into the normal working status and execute the image captured within the photographic area in front of the terminal in real time, if the predetermined length of time is reached.

* * * * *